May 25, 1954   J. WRIGHT ET AL   2,679,303
VEHICLE BRAKE

Filed March 27, 1951   3 Sheets-Sheet 1

INVENTORS
Joseph Wright
Henry James Butler
by Benj. T. Rauber
their attorney

Patented May 25, 1954

2,679,303

UNITED STATES PATENT OFFICE 2,679,303

VEHICLE BRAKE

Joseph Wright, Solihull, and Henry James Butler, Sutton Coldfield, England, assignors to Dunlop Rubber Company Limited, London County, England, a British company Application March 27, 1951, Serial No. 217,719

Claims priority, application Great Britain April 21, 1950

3 Claims. (Cl. 188—152)

This invention relates to a vehicle brake, and more particularly to brakes for heavy commercial vehicles, buses, trains, track-laying vehicles and the like.

Brakes for such vehicles are normally of the fluid pressure operated drum type and comprise an axially aligned drum rotatable by the wheel or axle and non-rotatable friction linings adapted to contact the inner periphery of the drum. Each lining extends around a substantial portion of the periphery of the drum and is mounted on a shoe which is pivotable at one end and a fluid pressure operated piston and cylinder mechanism is associated with the other end. Thus when the cylinder is pressurized the lining is forced into frictional contact with the drum, so braking the wheel or axle, as the case may be.

A brake of this nature has a number of disadvantages. Since the friction linings contact with the greater part of the inner periphery of the drum, very little air can get to the braking surface to cool it. The brakes thus get very hot when frequently applied, and "brake fade" soon sets in. This is particularly disadvantageous in public transport vehicles, which have to make frequent stops to pick up and set down passengers, and also for track-laying vehicles, such as tanks, which use their brakes for steering. Again, the conventional brake drum expands radially outwardly on heating, and greater movement of the shoes and linings is required to ensure adequate frictional engagement, whilst distortion of the drum takes place on excessive application of the brakes. Furthermore, the frictional area available with a drum fitting within a wheel is frequently inadequate for vehicles of considerable weight and capable of high speeds.

The object of this invention is to provide an improved brake particularly for heavy vehicles or the like which to a large extent overcomes the above disadvantages.

According to the present invention a brake for vehicles comprises an annular hollow rotatable braking member provided with radially extending braking surfaces, non-rotatable pressure plates extending between said surfaces and provided with friction facings adapted to frictionally engage said braking surfaces, a fluid pressure operated mechanism associated with said plates to effect said engagement and means to prevent rotation of said plates when the brake is applied.

According to the invention also a brake for vehicles comprises an annular hollow rotatable braking member provided with radially extending braking surfaces, non-rotatable pressure plates extending diametrically across said member and provided at each end thereof with a facing of friction material adapted to frictionally engage said braking surfaces, a fluid pressure operated mechanism associated with said plates to effect said engagement and means to prevent rotation of said plates when the brake is applied.

Preferably a brake for vehicles comprises an annular hollow rotatable braking member provided with two pairs of radially extending braking surfaces within said member, a pair of pressure plates associated with each pair of braking surfaces, friction facings secured to said pressure plates and adapted to frictionally engage said braking surfaces, a fluid pressure operated mechanism associated with each pair of pressure plates to effect said frictional engagement and means to prevent rotation of said plates when the brake is applied. The outer periphery of the braking member is preferably finned to increase the dissipation of heat generated on braking.

In order that the invention shall be more readily described, reference is made to the accompanying drawings, of which:

Figure 1:
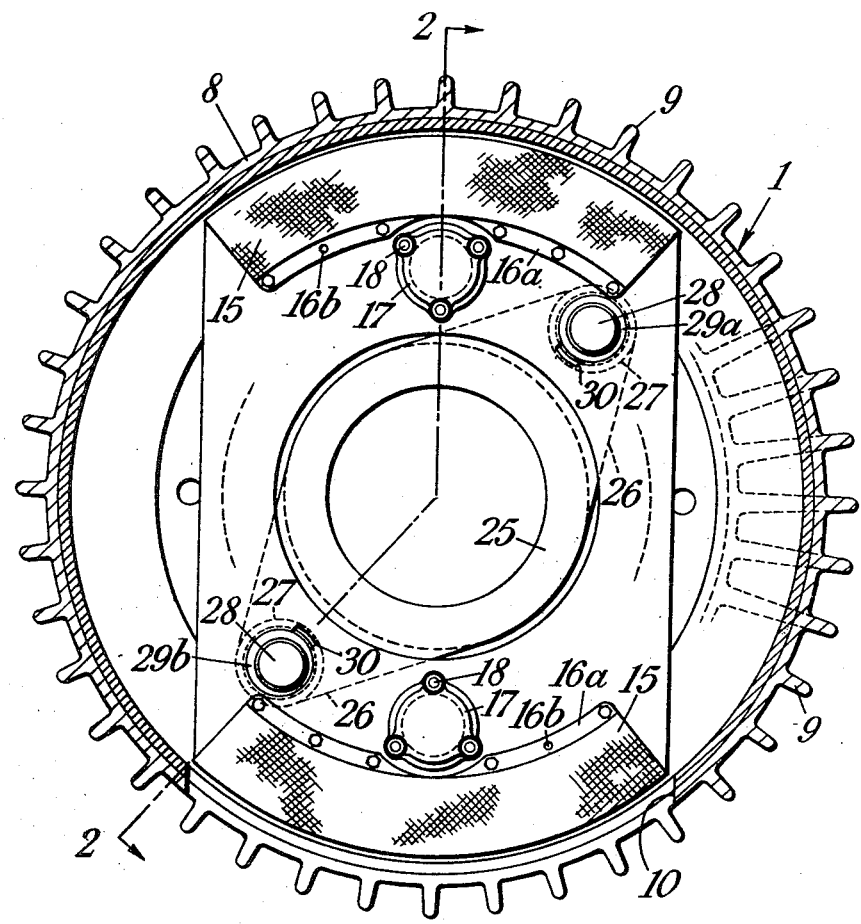
Figure 1 is a section taken diametrically through a brake constructed in accordance with the present invention.
Figure 2:
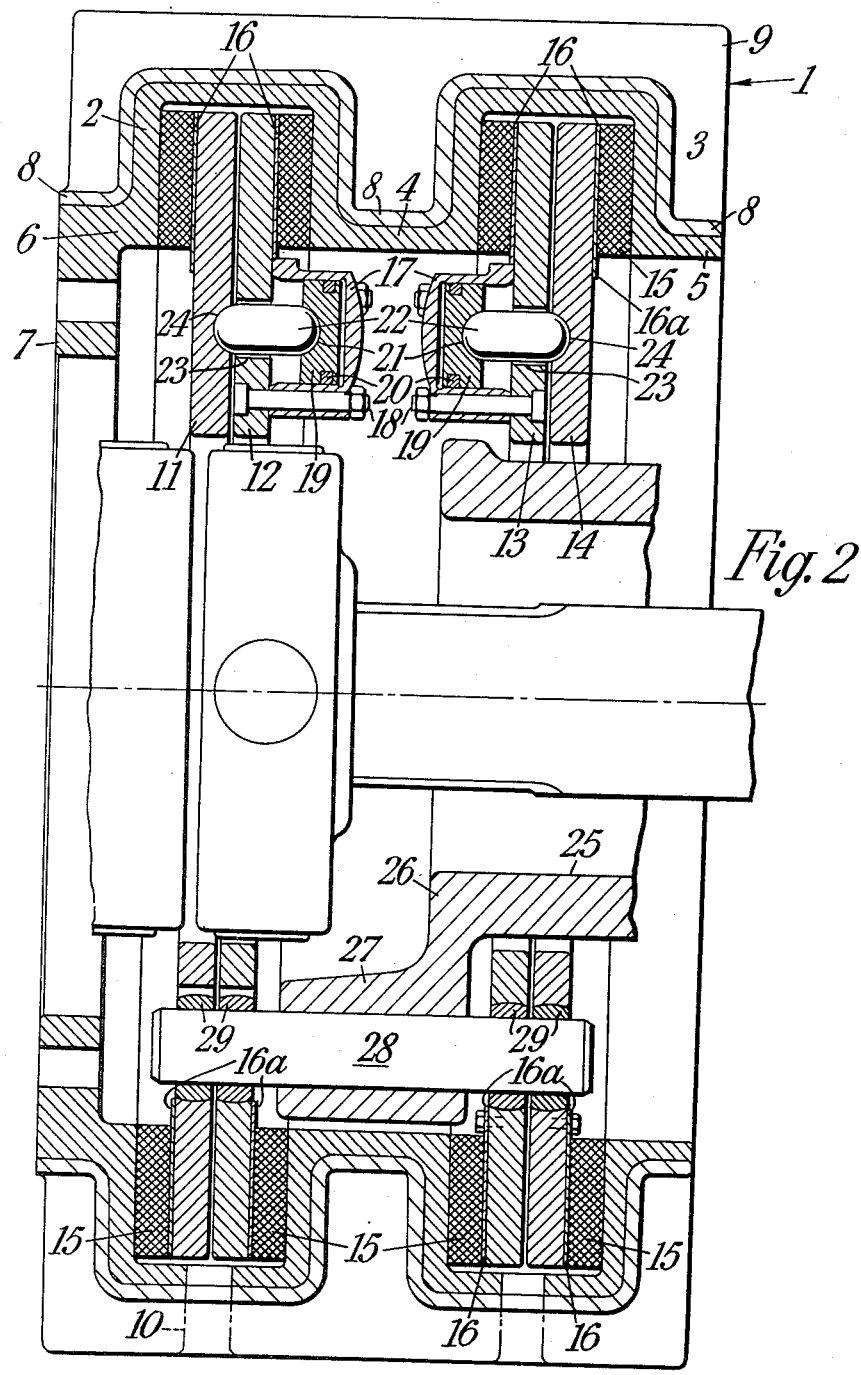
Figure 2 is a section taken on the line 2—2 of Figure 1 and looking in the direction of the arrows.
Figure 3:
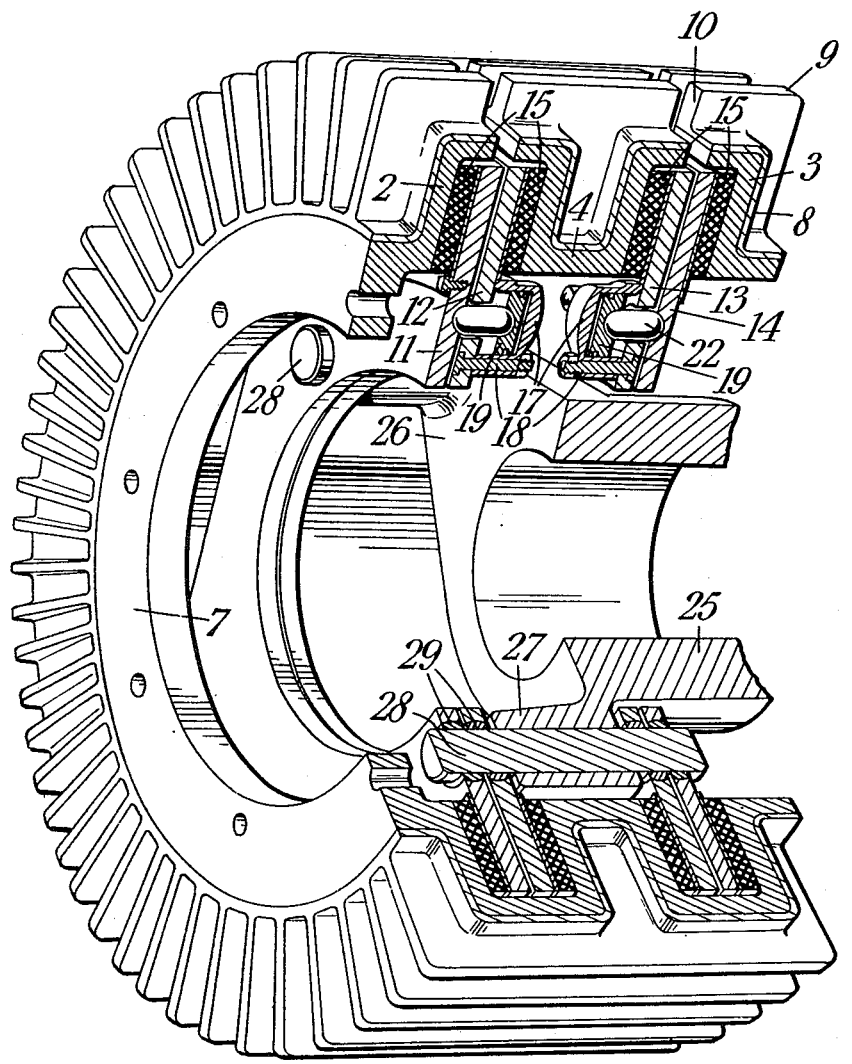
Figure 3 is a perspective, part-sectional view of the brake.

The embodiment of the invention illustrated and herein described is suitable for a tank and comprises a braking member which is secured to the driving shaft. Said braking member 1 consists of two annular parts 2 and 3 of U-section having their open sides at the inner periphery and said parts, which are of equal dimensions, are co-axial and are spaced apart by an axially-extending web 4 which is integral with the inner peripheral end of adjacent side walls of the two annular parts 2 and 3. Two annular flanges 5 and 6 extend axially from the ends of the side walls of said two parts remote from one another, and said two annular flanges are co-axial with the web 4 and are of substantially equal length. An annular securing flange 7 extends radially inwardly from member 6, and is provided with a plurality of axially-extending equi-spaced holes by which the braking members may be secured to a member (not illustrated) solid with the driving shaft.

The annular parts, the web joining them, the annular flanges and the securing flange are all formed integrally of cast iron. A layer of aluminium 8 is cast on the outer peripheries of said components, and from the outer periphery of said layer a plurality of axially-aligned fins 9 extend radially outwards to the same level, the fins thus being deeper between and on each side of the two annular parts. The base of each U-sectioned part is provided with a circumferentially-extending slot 10 of rectangular section, having a width of substantially one quarter the width of said base, said slots being axially-aligned. Each slot extends for approximately one quarter the periphery of the part, and the aluminium layer and fins are likewise slotted over the same area.

Four pressure plates 11, 12, 13 and 14 are fitted within the braking member, two to each annular part. Each plate has a thickness slightly less than the width of the slots, hereinbefore described, and a width slightly less than the length of said slots. The sides of the plate are parallel, and the ends, which fit adjacent the base of said annular parts, are rounded to the circumference thereof. A circular hole is provided centrally in each pressure plate. The pressure plates are fitted in the braking member by sliding them, one at a time, through the slot provided in each annular part. After the pressure plates have thus been slid into position the friction material 15, secured to the backing plate 16, is mounted on the pressure plates 11, 12, 13 and 14 respectively by means of the screws 16b.

A segmental facing 15 of friction material is associated with each end of the pressure plates, there being thus eight facings in all. Each facing is secured to a thin metal backing plate 16 having an extension 16a on the inner peripheral side of the facing provided with six equispaced holes 16b. The extensions on the backing plates are secured by bolts to the pressure plates so that a facing of friction material is interposed between the end of each plate and the associated side wall, or braking wall, of the annular U-sectioned part. In this position each pair of pressure plates is abutting one another substantially centrally of the base of the annular part. Each facing of friction material extends for approximately one quarter of the periphery of each braking wall.

The pressure plates are arranged in two pairs 11, 12, 13 and 14. There is thus an outer plate 11 and 14 to each pair, i. e. nearest one side of the braking member, and an inner plate 12 and 13, i. e. nearest the centre of said braking member. A cylinder 17 is secured by bolts 18 to each end of each inner pressure plate 12 and 13, intermediate the central circular hole and the facing of friction material, and on the centre line of the plate. The open end of each cylinder abuts the plate, the base being presented away from the plate and said base is provided with a connection (not illustrated) for pressure fluid. The cylinders of each pair on the same side of the wheel are axially aligned and are adjacent one another.

A piston 19 is slidably fitted in each cylinder and is provided with a sealing ring 20 to prevent leakage of pressure fluid around the periphery thereof. The face of the piston remote from the base of the cylinder is provided centrally with a part-spherical recess 21 and seated in said recess is one end of a stud 22 which passes through a hole 23 in each inner plate 12, 13 and seats in a part-spherical recess 24 in the outer plate 11, 14. The ends of said stud are part-spherical, i. e. complementary to said recesses, and the diameter of the stud is slightly less than the hole in the inner plate, through which it passes.

Torque resisting means are provided to prevent the braking mechanism from rotating when the braking member rotates. Said means comprise an annular member non-rotatably secured to a part of the tank structure and extending through the central hole of one pair of pressure plates 13, 14 and concentric with the rotatable driving shaft, into the braking member. Two substantially triangular flanges 26, integral with the annular member, extend radially outward from the end thereof into the annular space between the two pairs of pressure plates, and are diametrically opposite one another. Integral with the end of each flange, i. e. at its apex, is a cylindrical boss 27 which is spaced close to the web of the braking member and has its longitudinal axis parallel to the axis of said member. The two cylindrical bosses are substantially the same distance from the centre of the braking member as the cylinders but are angularly displaced about 40° relative to said cylinders, and are diametrically opposite one another on opposite sides of the braking member.

An axially-extending hole is provided centrally through each cylindrical boss and a torque pin 28 is secured in said hole, having an equal portion projecting from each end thereof. The pressure plates are provided at each end with holes through which the ends of the pins pass, thus preventing circumferential movement of the pressure plates when the brakes are applied. Said holes in the pressure plates are provided with concave part-spherical sides, and fitted in each of said holes is a bearing bush 29 having complementary convex sides so that the bush can swivel about the axis of the hole. The holes are each provided on their periphery with a rectangular slot 30 of slightly greater width than the thickness of the bushes. These slots are provided to permit the insertion and withdrawal of the bushes.

The bushes 29a (Figure 1) of the axially aligned set on one side of the wheel are each provided with a hole concentric with the bush and through which the end of the pin 28 is slidably fitted. The bushes 29b of the axially aligned set on the other side of the wheel have the holes for the pin slightly offset from the centre of the bush, for a purpose to be later described.

To apply the brake, pressure fluid is fed simultaneously into all four cylinders. An increase of fluid pressure inside said cylinders causes the pistons and the base of the cylinders to move mutually away from each other. The cylinders are each connected to the inner pressure plates whilst the pistons are connected, through the pressure studs to the outer pressure plates. Thus on an increase of fluid pressure between a piston and its cylinder each pair of pressure plates will slide along the pins and move mutually away from one another, and the facings of friction material secured to the ends thereof will be forced in frictional engagement against the braking walls of the braking member.

The iron braking walls of the braking member are heated by said frictional engagement and this heat, conducted through to the aluminium finning is speedily dissipated by radiation. The friction pads associated with one braking wall occupy only about half the effective area of that wall, the remainder revolving in air, with beneficial effects on cooling. The brake, therefore, does not get so hot that the condition known as "brake fade" is likely to set in. Since a very substantial area of friction pad is provided a brake of this nature is very suitable for heavy transport vehicles and the like.

A feature of the invention lies in the fact that accommodation is provided for the pressure plates, and hence the friction facings, to rock about their normal plane. It is known that friction facings do not wear evenly over their entire surface, and in fact may taper from one radial edge to the other or from one circumferential edge to the other, and the facing on one end of a pressure plate may wear more rapidly than that at the other end. The pressure plates are thus inclined to tilt when a certain amount of wear has taken place, and unless accommodation is provided the plate will stick on the pins, and the brakes will jam. In the embodiment herein described the axes of the bearing bushes are parallel to the axes of the pins and the pressure plates rock about the convex peripheries of the bushes. Thus, however much the plates tilt, and in whatever direction, the axes of the bearing bushes will still be parallel to the axes of the pins. It will be noted that the connection between the piston and the outer pressure plate of each set is also provided with accommodation for tilting, in that the ends of the pressure stud are rounded and seat in complementary recesses in the piston and plate, and the hole for the stud through the inner plate is of larger diameter than the stud.

If the pressure plate tilts out of the plane normal to the axis of the braking member, the distance between the pins, taken along the longitudinal axis of the plate, will increase. Means to compensate for this increased distance on tilting are provided by having the eccentric holes in the bushes for the pins. As the plate tilts the bush is caused to move circumferentially round in its hole, thus increasing the distance between the centres of the pin holes in the bushes associated with the same plate. As described, it is preferable that only one bush of each pair in the same plate should be provided with an eccentric pin hole, as it is necessary that the plates should be firmly anchored in at least one location.

Whilst the brake of the present invention has been described as having a braking member comprising two annular U-sectioned parts the braking member may alternatively be provided with only one part or with three or more parts, and the brake-operating mechanism may then be adapted to follow suit. The brake is suitable, not only for tanks and track-laying vehicles, but also for heavy commercial vehicles, public transport vehicles and the like.

What we claim is:

1. A brake for vehicles comprising an annular rotatable braking member of U-section open at its inner periphery to provide a pair of radially-extending braking surfaces, a non-rotatable member, a pair of diametrically placed axially aligned torque-reaction pins carried by said latter member, a pair of pressure plates located in and extending diametrically across said braking member and having end portions within said U-section, friction facings secured to said end portions of said plates to frictionally engage said braking surfaces, fluid pressure operated mechanisms associated with both ends of said pressure plates to force said plates apart, a circular axially-extending hole extending through each end of said plates, each of said holes having a part-spherical periphery, and a bearing bush having a complementary convex periphery fitted in each of said holes to slidably receive the torque-reaction pins.

2. A brake for vehicles according to claim 1 wherein one bearing bush of each pressure plate is provided with an eccentric hole therethrough to slidably receive the pin.

3. A brake for vehicles according to claim 1 comprising a plurality of annular rotatable braking members, each having a brake applying mechanism.

References Cited in the file of this patent

UNITED STATES PATENTS

| Number | Name | Date |
| --- | --- | --- |
| 1,440,258 | Willien et al. | Dec. 26, 1922 |
| 2,055,244 | Wells | Sept. 22, 1936 |
| 2,199,785 | Dickson | May 7, 1940 |
| 2,381,166 | Hollerith | Aug. 7, 1945 |